United States Patent
Liebelt et al.

(10) Patent No.: US 9,862,041 B2
(45) Date of Patent: *Jan. 9, 2018

(54) ABRASIVE ARTICLES INCLUDING ABRASIVE PARTICLES BONDED TO AN ELONGATED BODY

(71) Applicants: SAINT-GOBAIN ABRASIVES, INC., Worcester, MA (US); SAINT-GOBAIN ABRASIFS, Conflans-Sainte-Honorine (FR)

(72) Inventors: Susanne Liebelt, Norderstedt (DE); Vincent Tesi, Bargteheide (DE); Theodor Von Bennigsen-Mackiewicz, Henstedt-Ulzburg (DE)

(73) Assignees: SAINT-GOBAIN ABRASIVES, INC., Worcester, MA (US); SAINT-GOBAIN ABRASIFS, Conflans-Sainte-Honorine (FR)

( * ) Notice: Subject to any disclaimer, the term of this patent is extended or adjusted under 35 U.S.C. 154(b) by 134 days.

This patent is subject to a terminal disclaimer.

(21) Appl. No.: 14/735,549

(22) Filed: Jun. 10, 2015

(65) Prior Publication Data
US 2015/0273599 A1 Oct. 1, 2015

Related U.S. Application Data

(60) Division of application No. 13/849,370, filed on Mar. 22, 2013, now Pat. No. 9,067,268, which is a
(Continued)

(51) Int. Cl.
*D06N 7/04* (2006.01)
*B23D 61/18* (2006.01)
(Continued)

(52) U.S. Cl.
CPC .......... *B23D 61/185* (2013.01); *B23D 65/00* (2013.01); *B24B 27/0633* (2013.01); *B24D 3/06* (2013.01);
(Continued)

(58) Field of Classification Search
None
See application file for complete search history.

(56) References Cited

U.S. PATENT DOCUMENTS 2,764,543 A   9/1952   Comstock et al.
2,784,536 A   3/1957   Barron
(Continued)

FOREIGN PATENT DOCUMENTS

CH   599837 A5   5/1978
CN   1275940 A   12/2000
(Continued)

OTHER PUBLICATIONS

International Search Report and Written Opinion for PCT Application No. PCT/US2016/039810, dated Oct. 11, 2016, 16 pages.
(Continued)

*Primary Examiner* — David Sample
*Assistant Examiner* — Nicole T Gugliotta
(74) *Attorney, Agent, or Firm* — Abel Law Group, LLP; Joseph P. Sullivan

(57) ABSTRACT

An abrasive article comprising an elongated body, a bonding layer overlying a surface of the elongated body, and abrasive grains contained within the bonding layer at an average abrasive grain concentration within a range between about 0.02 ct/m and about 0.30 ct/m.

14 Claims, 5 Drawing Sheets

Related U.S. Application Data continuation of application No. 12/857,378, filed on Aug. 16, 2010, now Pat. No. 8,425,640.

(60) Provisional application No. 61/234,202, filed on Aug. 14, 2009.

(51) Int. Cl.
*B23D 65/00* (2006.01)
*B24B 27/06* (2006.01)
*B24D 99/00* (2010.01)
*B24D 3/06* (2006.01)

(52) U.S. Cl.
CPC ....... *B24D 99/00* (2013.01); *Y10T 428/24372* (2015.01)

(56) References Cited

U.S. PATENT DOCUMENTS

| | | |
|---|---|---|
| 2,793,478 A | 5/1957 | Rohowetz |
| 3,150,470 A | 9/1964 | Barron |
| 3,178,273 A | 4/1965 | Libal |
| 3,854,898 A | 12/1974 | Whitney, Jr. et al. |
| 3,884,212 A | 5/1975 | Armstrong et al. |
| 3,894,673 A | 7/1975 | Lowder et al. |
| 3,906,684 A | 9/1975 | Marshall et al. |
| 3,984,214 A | 10/1976 | Pratt et al. |
| 3,997,302 A | 12/1976 | Supkis |
| 3,997,902 A | 12/1976 | Nard |
| 4,015,931 A | 4/1977 | Thankur |
| 4,018,576 A | 4/1977 | Lowder et al. |
| 4,031,851 A | 6/1977 | Camahort |
| 4,055,700 A | 10/1977 | Ronnquist et al. |
| 4,187,828 A | 2/1980 | Schmid |
| 4,384,564 A | 5/1983 | Smith et al. |
| 4,399,167 A | 8/1983 | Pipkin |
| 4,485,757 A | 12/1984 | Ebner |
| 4,627,950 A | 12/1986 | Matsui et al. |
| 4,643,740 A | 2/1987 | Nicolson |
| 4,646,710 A | 3/1987 | Schmid et al. |
| 4,681,538 A | 7/1987 | DeLuca et al. |
| 4,684,052 A | 8/1987 | McDonald et al. |
| 4,727,852 A | 3/1988 | Schmid et al. |
| 4,776,862 A | 10/1988 | Wiand |
| 4,811,170 A | 3/1989 | Pammer |
| 4,866,888 A | 9/1989 | Murai et al. |
| 4,907,564 A | 3/1990 | Sowa et al. |
| 4,968,326 A | 11/1990 | Wiand |
| 4,974,373 A | 12/1990 | Kawashima et al. |
| 5,062,865 A | 11/1991 | Chen et al. |
| 5,127,197 A | 7/1992 | Brukvoort et al. |
| 5,127,924 A | 7/1992 | Russell |
| 5,213,591 A | 5/1993 | Celikkaya et al. |
| 5,218,949 A | 6/1993 | Tomlinson et al. |
| 5,250,084 A | 10/1993 | Lansell et al. |
| 5,251,802 A | 10/1993 | Bruxvoort et al. |
| 5,318,604 A | 6/1994 | Gorsuch et al. |
| 5,377,568 A | 1/1995 | Hauser |
| 5,377,659 A | 1/1995 | Tank et al. |
| 5,383,443 A | 1/1995 | Buyens |
| 5,438,973 A | 8/1995 | Schmid et al. |
| 5,454,750 A | 10/1995 | Cosmano et al. |
| 5,492,771 A | 2/1996 | Lowder et al. |
| 5,496,386 A | 3/1996 | Broberg et al. |
| 5,511,718 A | 4/1996 | Lowder et al. |
| 5,544,643 A | 8/1996 | Bauer et al. |
| 5,560,753 A * | 10/1996 | Schnabel ............. B24D 3/344 428/141 |
| 5,571,296 A | 11/1996 | Barber, Jr. et al. |
| 5,578,098 A | 11/1996 | Gagliardi et al. |
| 5,595,578 A | 1/1997 | Stubbs et al. |
| 5,616,065 A | 4/1997 | Egglhuber |
| 5,643,055 A | 7/1997 | Linzell |
| 5,660,320 A | 8/1997 | Hoffmuller et al. |
| 5,681,361 A | 10/1997 | Sanders, Jr. |
| 5,707,509 A | 1/1998 | Hartweg |
| 5,840,089 A | 11/1998 | Chesley et al. |
| 5,846,269 A | 12/1998 | Shiue et al. |
| 5,855,314 A | 1/1999 | Shiue et al. |
| 5,913,305 A | 6/1999 | Hauser |
| 5,924,917 A | 7/1999 | Benedict |
| 5,935,407 A | 8/1999 | Nenov et al. |
| 5,964,210 A | 10/1999 | Hodsden |
| 5,975,988 A | 11/1999 | Christianson |
| 6,006,738 A | 12/1999 | Itoh et al. |
| 6,056,794 A | 5/2000 | Stoetzel et al. |
| 6,065,462 A | 5/2000 | Hodsden et al. |
| 6,070,570 A | 6/2000 | Ueoka et al. |
| 6,102,024 A | 8/2000 | Buljan et al. |
| 6,194,068 B1 | 2/2001 | Ohashi et al. |
| 6,194,086 B1 | 2/2001 | Nenov et al. |
| 6,228,133 B1 | 5/2001 | Thurber et al. |
| 6,279,564 B1 | 8/2001 | Hodseden et al. |
| 6,286,498 B1 | 9/2001 | Sung |
| 6,311,684 B1 | 11/2001 | Hodsden et al. |
| 6,319,108 B1 | 11/2001 | Adefris et al. |
| 6,368,198 B1 | 4/2002 | Sung et al. |
| 6,463,921 B2 | 10/2002 | Shimazaki et al. |
| 6,613,113 B2 | 9/2003 | Minick et al. |
| 6,679,243 B2 | 1/2004 | Sung |
| 6,755,720 B1 | 6/2004 | Ishizaki et al. |
| 6,783,442 B2 | 8/2004 | Lukschandel et al. |
| 6,790,126 B2 | 9/2004 | Wood et al. |
| 6,797,023 B2 | 9/2004 | Knapp et al. |
| 6,830,598 B1 | 12/2004 | Sung |
| 6,858,050 B2 | 2/2005 | Palmgren |
| 6,899,920 B2 | 5/2005 | Meyer |
| 6,915,796 B2 | 7/2005 | Sung |
| 6,939,413 B2 | 9/2005 | Crockett |
| 7,089,925 B1 | 8/2006 | Lin et al. |
| 7,124,753 B2 | 10/2006 | Sung |
| 7,134,430 B2 | 11/2006 | Kim et al. |
| 7,261,752 B2 | 8/2007 | Sung |
| 7,306,508 B2 | 12/2007 | Kawasaki et al. |
| 7,435,276 B2 | 10/2008 | Chen et al. |
| 7,556,558 B2 | 7/2009 | Palmgren |
| 7,704,127 B2 | 4/2010 | Taniguchi et al. |
| 7,926,478 B2 | 4/2011 | Nakai et al. |
| 8,037,878 B2 | 10/2011 | Kitagawa et al. |
| 8,206,472 B2 | 6/2012 | Tani et al. |
| 8,257,572 B2 | 9/2012 | Castro et al. |
| 8,291,895 B2 | 10/2012 | Sudarshan et al. |
| 8,425,640 B2 | 4/2013 | Liebelt et al. |
| 8,657,652 B2 * | 2/2014 | Hwang ............. B24B 53/017 451/443 |
| 8,677,986 B2 | 3/2014 | Kazahaya et al. |
| 8,707,944 B2 | 4/2014 | Morita et al. |
| 8,720,429 B2 | 5/2014 | Lange et al. |
| 8,802,602 B2 | 8/2014 | Schmitjes et al. |
| 8,820,308 B2 | 9/2014 | Sudarshan et al. |
| 9,067,268 B2 * | 6/2015 | Liebelt ............. B23D 61/185 |
| 9,254,552 B2 | 2/2016 | Tian et al. |
| 9,375,826 B2 | 6/2016 | Tian et al. |
| 9,533,397 B2 | 1/2017 | Rehrig et al. |
| 9,687,962 B2 | 6/2017 | Tian et al. |
| 2001/0025457 A1 | 10/2001 | Tselesin |
| 2001/0039070 A1 | 11/2001 | Sekine |
| 2002/0010068 A1 | 1/2002 | Komatsu |
| 2002/0077054 A1 | 6/2002 | Sung |
| 2002/0100469 A1 | 8/2002 | Shimazaki et al. |
| 2003/0084894 A1 | 5/2003 | Sung |
| 2003/0089362 A1 | 5/2003 | Yamada et al. |
| 2003/0121212 A1 | 7/2003 | Minick et al. |
| 2003/0134577 A1 | 7/2003 | Coad |
| 2003/0140914 A1 | 7/2003 | Minick et al. |
| 2004/0107648 A1 | 6/2004 | Sung |
| 2004/0112359 A1 | 6/2004 | Sung |
| 2004/0244789 A1 | 12/2004 | Jentgens |
| 2005/0018642 A1 | 1/2005 | Nakamura |
| 2005/0103320 A1 | 5/2005 | Ebner |
| 2006/0016127 A1 | 1/2006 | Sung |
| 2006/0083688 A1 | 4/2006 | Singaram et al. |
| 2006/0194038 A1 | 8/2006 | You et al. |
| 2006/0258268 A1 | 11/2006 | Miyata et al. |

(56) References Cited

U.S. PATENT DOCUMENTS

| | | |
|---|---|---|
| 2007/0023027 A1 | 2/2007 | Nakai et al. |
| 2007/0051354 A1 | 3/2007 | Sung |
| 2007/0051355 A1 | 3/2007 | Sung |
| 2007/0151388 A1 | 7/2007 | Yazawa et al. |
| 2007/0151554 A1 | 7/2007 | Song et al. |
| 2007/0261690 A1 | 11/2007 | Jentgens |
| 2007/0283944 A1 | 12/2007 | Hukin |
| 2008/0053000 A1 | 3/2008 | Palmgren et al. |
| 2008/0141593 A1 | 6/2008 | Bhatia |
| 2008/0141994 A1 | 6/2008 | Skovhaard-Soerensen et al. |
| 2008/0148650 A1 | 6/2008 | You |
| 2008/0206576 A1 | 8/2008 | Qian et al. |
| 2008/0212733 A1 | 9/2008 | Pop et al. |
| 2008/0261499 A1 | 10/2008 | Tani et al. |
| 2008/0271783 A1 | 11/2008 | Murakami et al. |
| 2009/0064983 A1 | 3/2009 | Sudarshan et al. |
| 2009/0098365 A1 | 4/2009 | Moeltgen |
| 2009/0120422 A1 | 5/2009 | Taniguchi |
| 2009/0202781 A1 | 8/2009 | Hall et al. |
| 2009/0242410 A1 | 10/2009 | Castro et al. |
| 2009/0283089 A1 | 11/2009 | Sung |
| 2010/0197202 A1 | 8/2010 | Branagan et al. |
| 2011/0009039 A1 | 1/2011 | Balagani et al. |
| 2011/0039070 A1 | 2/2011 | Liebelt et al. |
| 2011/0045292 A1 | 2/2011 | Tian et al. |
| 2011/0263187 A1 | 10/2011 | Liu et al. |
| 2011/0308371 A1 | 12/2011 | Morita et al. |
| 2012/0037140 A1 | 2/2012 | Campos et al. |
| 2012/0055097 A1 | 3/2012 | Tian et al. |
| 2012/0167482 A1 | 7/2012 | Tian et al. |
| 2012/0216787 A1 | 8/2012 | Morita et al. |
| 2012/0295119 A1 | 11/2012 | David |
| 2013/0000211 A1 | 1/2013 | Upadhyay et al. |
| 2013/0032129 A1 | 2/2013 | Otani et al. |
| 2013/0061535 A1 | 3/2013 | Tian et al. |
| 2013/0084786 A1 | 4/2013 | Rehrig et al. |
| 2013/0092143 A1 | 4/2013 | Sudarshan et al. |
| 2013/0205676 A1 | 8/2013 | Tian et al. |
| 2013/0219801 A1 | 8/2013 | Liebelt et al. |
| 2014/0007513 A1 | 1/2014 | Rehrig et al. |
| 2014/0011434 A1 | 1/2014 | Puzemis et al. |
| 2014/0013675 A1 | 1/2014 | Tian et al. |
| 2014/0017984 A1 | 1/2014 | Rehrig et al. |
| 2014/0017985 A1 | 1/2014 | Tian et al. |
| 2014/0150766 A1 | 6/2014 | Che et al. |
| 2014/0311472 A1 | 10/2014 | Tian et al. |
| 2016/0375514 A1 | 12/2016 | Tian et al. |
| 2017/0066069 A1 | 3/2017 | Rehrig et al. |
| 2017/0252897 A1 | 9/2017 | Tian et al. |

FOREIGN PATENT DOCUMENTS

| | | |
|---|---|---|
| CN | 1456410 A | 11/2003 |
| CN | 1488480 A | 4/2004 |
| CN | 1583336 A | 2/2005 |
| CN | 1721113 A | 1/2006 |
| CN | 1739927 A | 3/2006 |
| CN | 101066614 A | 11/2007 |
| CN | 101132884 A | 2/2008 |
| CN | 201283606 Y | 8/2009 |
| CN | 101564828 A | 10/2009 |
| CN | 101712135 A | 5/2010 |
| CN | 102896373 A | 1/2013 |
| DE | 10-2004-043718 A1 | 3/2006 |
| EP | 0237784 B1 | 6/1991 |
| EP | 1371438 A1 | 12/2003 |
| EP | 1475463 B1 | 11/2004 |
| EP | 1685934 A1 | 8/2006 |
| GB | 876605 A | 9/1961 |
| GB | 962357 A | 7/1964 |
| GB | 1254365 A | 11/1971 |
| GB | 1342359 A | 1/1974 |
| JP | 61-071949 A | 4/1986 |
| JP | 63-102868 A | 5/1988 |
| JP | 3079264 A | 4/1991 |
| JP | H06262533 A | 9/1994 |
| JP | H07-096454 A | 4/1995 |
| JP | H08-126953 A | 5/1996 |
| JP | H09-150314 A | 6/1997 |
| JP | H09-155631 A | 6/1997 |
| JP | H09-254006 | 9/1997 |
| JP | H10-034544 A | 2/1998 |
| JP | H10-118938 A | 5/1998 |
| JP | H10-256581 A | 9/1998 |
| JP | H10-328932 A | 12/1998 |
| JP | H11-216657 A | 8/1999 |
| JP | H11-216658 A | 8/1999 |
| JP | 29-57571 B1 | 10/1999 |
| JP | H11-277398 A | 10/1999 |
| JP | H11-320379 A | 11/1999 |
| JP | H11-347911 A | 12/1999 |
| JP | 2000-052226 A | 2/2000 |
| JP | 2000-071160 A | 3/2000 |
| JP | 2000-071162 A | 3/2000 |
| JP | 2000-094297 A | 4/2000 |
| JP | 2000-158318 A | 6/2000 |
| JP | 2000-158319 A | 6/2000 |
| JP | 2000-218504 A | 8/2000 |
| JP | 2000-246542 A | 9/2000 |
| JP | 2000-246654 A | 9/2000 |
| JP | 2000-263452 A | 9/2000 |
| JP | 2000-271872 A | 10/2000 |
| JP | 2000-288902 A | 10/2000 |
| JP | 3104553 B2 | 10/2000 |
| JP | 2001-054850 A | 2/2001 |
| JP | 2001-105295 A | 4/2001 |
| JP | 2001-113519 A | 4/2001 |
| JP | 2001-259993 A | 9/2001 |
| JP | 2001-277092 A | 10/2001 |
| JP | 2001-287146 A | 10/2001 |
| JP | 2001-341076 A1 | 12/2001 |
| JP | 2002-172564 A | 6/2002 |
| JP | 2002-205272 A | 7/2002 |
| JP | 2002-254286 A | 9/2002 |
| JP | 2002-254327 A | 9/2002 |
| JP | 2002-273663 A | 9/2002 |
| JP | 2002-326151 A | 11/2002 |
| JP | 2002-331466 A | 11/2002 |
| JP | 2002-361566 A | 12/2002 |
| JP | 2003-231063 A | 8/2003 |
| JP | 2003-525130 A | 8/2003 |
| JP | 2003-275970 A | 9/2003 |
| JP | 2003-291057 A | 10/2003 |
| JP | 2004-009239 A | 1/2004 |
| JP | 2004-050318 A | 2/2004 |
| JP | 2004050301 A | 2/2004 |
| JP | 2004-174680 A | 6/2004 |
| JP | 3103807 U | 6/2004 |
| JP | 2004-209573 A | 7/2004 |
| JP | 2004-216553 A | 8/2004 |
| JP | 2004-261889 A | 9/2004 |
| JP | 2004-338023 A | 12/2004 |
| JP | 2005-007221 A | 1/2005 |
| JP | 2002-036091 A | 2/2005 |
| JP | 2005-238377 A | 9/2005 |
| JP | 2006-007387 A | 1/2006 |
| JP | 2006-123024 A | 5/2006 |
| JP | 2006-123055 A | 5/2006 |
| JP | 2006-130636 A | 5/2006 |
| JP | 3777285 B2 | 5/2006 |
| JP | 2006-150505 A | 6/2006 |
| JP | 2006-179677 A | 7/2006 |
| JP | 2006-181701 A | 7/2006 |
| JP | 2006-231479 A | 9/2006 |
| JP | 2006-272499 A | 10/2006 |
| JP | 2007-021677 A | 2/2007 |
| JP | 2007-044870 A | 2/2007 |
| JP | 2007-061976 A | 3/2007 |
| JP | 2007-152485 A | 6/2007 |
| JP | 2007-152486 A | 6/2007 |
| JP | 2007-196312 A | 8/2007 |
| JP | 2007-196329 A | 8/2007 |
| JP | 2007-203393 A | 8/2007 |
| JP | 2007-203417 A | 8/2007 |

(56) References Cited

FOREIGN PATENT DOCUMENTS

| | | | |
|---|---|---|---|
| JP | 2007-237628 A | 9/2007 | |
| JP | 2007-253268 A | 10/2007 | |
| JP | 2007-268627 A | 10/2007 | |
| JP | 2007-281176 A | 10/2007 | |
| JP | 2007-307261 A | 11/2007 | |
| JP | 2008-068332 A | 3/2008 | |
| JP | 2008-221406 A | 9/2008 | |
| JP | 2009-066689 A | 4/2009 | |
| JP | 2009285791 A | 12/2009 | |
| JP | 2010-000583 A | 1/2010 | |
| JP | 2010-000584 A | 1/2010 | |
| JP | 2010-131698 A | 6/2010 | |
| JP | 2010-201602 A | 9/2010 | |
| JP | 2010-284754 A | 12/2010 | |
| JP | 2011-016208 A | 1/2011 | |
| JP | 2011-137213 A | 7/2011 | |
| JP | 2011-161613 A | 8/2011 | |
| KR | 2000-0033534 A | 6/2000 | |
| KR | 2001-0055980 A | 7/2001 | |
| KR | 10-2006-0006856 A | 1/2006 | |
| RU | 2078680 C1 | 5/1997 | |
| RU | 83210 U1 | 5/2009 | |
| TW | 442370 B | 6/2001 | |
| TW | I291389 B | 12/2007 | |
| TW | 201111106 A | 4/2011 | |
| WO | 98/05466 A1 | 2/1998 | |
| WO | 9821004 A1 | 5/1998 | |
| WO | 00/61324 A2 | 10/2000 | |
| WO | 0143918 A2 | 6/2001 | |
| WO | 2004/069479 A1 | 8/2004 | |
| WO | 2005/064677 A1 | 7/2005 | |
| WO | 2006/070534 A1 | 7/2006 | |
| WO | 2006/083688 A1 | 8/2006 | |
| WO | 2008/000072 A1 | 1/2008 | |
| WO | 2009/064345 A2 | 5/2009 | |
| WO | 2009/158507 A2 | 12/2009 | |
| WO | 2010/125083 A1 | 11/2010 | |
| WO | 2010/125085 A1 | 11/2010 | |
| WO | 2011/020105 A2 | 2/2011 | |
| WO | 2011/020109 A2 | 2/2011 | |
| WO | 2011138192 A2 | 11/2011 | |
| WO | 2012/092614 A2 | 7/2012 | |
| WO | 2013/040423 A2 | 3/2013 | |
| WO | 2013/049204 A2 | 4/2013 | |
| WO | 2013/147892 A1 | 10/2013 | |
| WO | 2014/004982 A1 | 1/2014 | |
| WO | 2014/004991 A1 | 1/2014 | |
| WO | 2014/005009 A1 | 1/2014 | |
| WO | 2014/005015 A1 | 1/2014 | |
| WO | 2014/005028 A1 | 1/2014 | |
| WO | 2014/005037 A1 | 1/2014 | |
| WO | 2014/172611 A1 | 10/2014 | |
| WO | 2017004037 A1 | 1/2017 | |

OTHER PUBLICATIONS

Enomoto Toshiyuki et al "Development of a Resinoid Diamond Wire Containing Metal Power for Slicing a Slicing Ingot." Annals of the CIRP. 32.1 (1983): 273-276.

Jun Sugawara et al., "Development of fixed abrasive-grain wire saw with less cutting loss" SEI Technical Review No. 58, Jun. 2004, pp. 7-11.

Daisuke Ide, "Resin Bond Diamond wire for slicing ceramics", Industrial Diamond Review vol. 2/2007, pp. 32-34.

Y. Chiba et al., "Development of a high-speed manufacturing method for electroplated diamond wire tools", Annals of the CIRP vol. 52/1/2003, pp. 281-284.

Osamu Kamiya et al., "Diamond and metal bonding by active solder for micro-cutting wire", Int. J. of Mdern Physics B, vol. 20, Nos. 25-27 (2006) pp. 3932-3937.

Fujisawa, M. et al. "Precision Sawing with Wire Saw." Annals of the CIRP. 32.1 (1983): 87-90.

Conversion US mesh (tamis)—microns: http://www.granuloshop.com/Conversion.htm (Sep. 2, 2003).

International Search Report for PCT/US2010/045643 dated Apr. 29, 2011.

International Search Report for PCT/US2013/048491 dated Aug. 26, 2013.

Handbook of Thermoset Plastics, 2nd edition, p. 28, 1998.

International Search Report for PCT/US2010/045647 dated Apr. 29, 2011.

International Search Report for PCT/US2012/031699 dated Nov. 16, 2012.

International Search Report for PCT/US2011/068240 dated Aug. 27, 2012.

International Search Report for PCT/US2012/055529 dated Feb. 21, 2013.

International Search Report for PCT/US2012/057334 dated Mar. 28, 2013.

Higashi, Taisuke et al., Development of Low Melting Temperature Coating Materials for High Performance Diamonds Wire Saw: Effect of an Additive on Mechanical Properties.

Nakamura Choko Co., Ltd., "Company Report", Mar. 31, 2010, 10 pages.

International Search Report for PCT/US2013/048609 dated Sep. 2, 2013.

International Search Report for PCT/US2013/048511 dated Aug. 27, 2013.

International Search Report for PCT/US2013/048549 dated Sep. 11, 2013.

International Search Report for PCT/US2013/048565 dated Aug. 27, 2013.

International Search Report for PCT/US2013/048587 dated Sep. 17, 2013.

Patel, Mitesh M., "Characterizing Fatigue and Fracture Response of Medical Grade Nickel-Titanium Alloys by Rotary Beam Testing," Presented at the ASTM Symposium on Fatigue and Fracture of Medical Metallic Materials and Devices, Dallas, Texas, Nov. 2005, 12 pages.

International Search Report for PCT/US2014/034611 dated Aug. 28, 2014.

Copper and Copper Alloys Jan. 1, 2001 (exerpt)—Davis, ASM International; pp. 127-130.

International Search Report for International Application No. PCT/JP2010/069294 dated Nov. 22, 2010.

\* cited by examiner

US 9,862,041 B2

ABRASIVE ARTICLES INCLUDING ABRASIVE PARTICLES BONDED TO AN ELONGATED BODY

CROSS-REFERENCE TO RELATED APPLICATION(S)

The present application is a Divisional of U.S. Continuation patent application Ser. No. 13/849,370 filed Mar. 22, 2013, which is a Continuation of U.S. Utility patent application Ser. No. 12/857,378 filed Aug. 16, 2010, which claims priority from U.S. Provisional Patent Application No. 61/234,202, filed Aug. 14, 2009, entitled "Abrasive Articles Including Abrasive Particles Bonded to An Elongated Body," naming inventors Susanne Liebelt, Vincent Tesi, and Theodor von Bennigsen-Mackiewicz, which application is incorporated by reference herein in its entirety.

BACKGROUND

Field of the Disclosure

The following is directed to abrasive articles, and particularly abrasive articles incorporating abrasive grains secured to an elongated body.

Description of the Related Art

A variety of abrasive tools have been developed over the past century for various industries for the general function of removing material from a workpiece, including for example sawing, drilling, polishing, cleaning, carving, and grinding. In particular reference to the electronics industry, abrasive tools suitable for slicing single crystal ingots of material to form wafers is particularly pertinent. As the industry continues to mature, the ingots have increasingly larger diameters, and it has become acceptable to use loose abrasives and wire saws for such works due to yield, productivity, affected layers, dimensional constraints and other factors.

Generally, wire saws are abrasive tools that include abrasive particles attached to a long length of wire that can be spooled at high speeds to produce a cutting action. While circular saws are limited to a cutting depth of less than the radius of the blade, wire saws can have greater flexibility allowing for cutting of straight or profiled cutting paths.

Various approaches have been taken in conventional fixed abrasive wire saws, such as producing these articles by sliding steel beads over a metal wire or cable, wherein the beads are separated by spacers. These beads may be covered by abrasive particles which are commonly attached by either electroplating or sintering. However, electroplating and sintering operations can be time consuming and thus costly ventures, prohibiting rapid production of the wire saw abrasive tool. Most of these wire saws have been used in applications, where kerf loss is not so dominating as in electronics applications, often to cut stone or marble. Some attempts have been made to attach abrasive particles via chemical bonding processes, such as brazing, but such fabrication methods reduce the flexibility of the wire saw, and the braze coating becomes susceptible to fatigue and premature failure. Other wire saws may use a resin to bind the abrasives to the wire. Unfortunately, the resin bonded wire saws tend to wear quickly and the abrasives are lost well before the useful life of the particles is realized, especially when cutting through hard materials.

Accordingly, the industry continues to need improved abrasive tools, particularly in the realm of wire sawing.

SUMMARY

According to one aspect, an abrasive article includes an elongated body, a bonding layer overlying a surface of the elongated body, and abrasive grains contained within the bonding layer at an average abrasive grain concentration within a range between about 0.02 ct/m and about 0.30 ct/m.

In accordance with another aspect, an abrasive article includes an elongated body, a bonding layer overlying a surface of the elongated body, and abrasive grains contained within the bonding layer. The abrasive article includes abrasive grains selected from a wide grit size distribution wherein at least 80% of the total number of abrasive grains have an average grit size contained within a grit size range of at least about 30 microns over a range of average grit sizes between about 1 micron to about 100 microns.

In still another aspect, an abrasive article includes an elongated body, a bonding layer overlying a surface of the elongated body, and abrasive grains contained within the bonding layer. The abrasive grains are selected from a wide grit size distribution wherein at least 80% of the total number of abrasive grains have an average grit size contained within a grit size range of at least about 30 microns over a range of average grit sizes between about 1 micron to about 100 microns, and the abrasive grains are contained within the bonding layer at an average abrasive grain concentration within a range between about 0.02 ct/m and about 0.30 ct/m.

According to still another aspect, an abrasive article includes an elongated body, a bonding layer overlying a surface of the elongated body, and abrasive grains contained within the bonding layer. The abrasive grains are contained within the bonding layer at an average abrasive grain concentration within a range between about 0.02 ct/m and about 0.30 ct/m, and wherein the abrasive article is capable of cutting through a total of at least about 200 $cm^2$ of sapphire at an average cutting rate of at least 0.8 mm/min.

In yet another aspect, a method of cutting sapphire includes the steps of providing an abrasive article having an elongated body and abrasive grains affixed to the elongated body and providing a sapphire article. The method further includes using the abrasive article to cut through a total of at least about 200 $cm^2$ of the sapphire article at an average cutting rate of at least 0.8 mm/min.

BRIEF DESCRIPTION OF THE DRAWINGS

The present disclosure may be better understood, and its numerous features and advantages made apparent to those skilled in the art by referencing the accompanying drawings.

DESCRIPTION OF THE PREFERRED EMBODIMENT(S)

Figure 1:
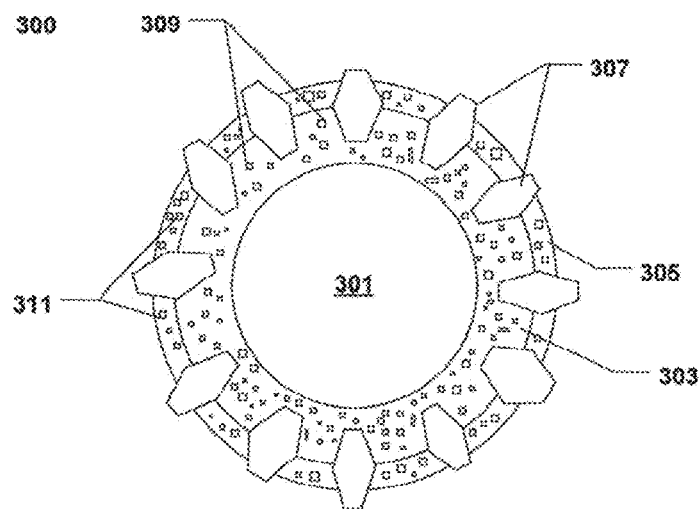
FIG. 1 includes a cross-sectional illustration of a portion of an abrasive article in accordance with an embodiment.

The following is generally directed to abrasive articles formed from an elongated body to which abrasive grains are secured. In particular, the abrasive articles of embodiments herein may suitable for processes using long lengths of abrasive articles, which can include for example wire sawing processes, which can be used in the electronics industry to segment boules or ingots of crystalline material. However, it will be appreciated that such abrasive articles as disclosed herein can be used for other applications.

The abrasive articles herein can utilize an elongated body, which may be a wire or other member having a length defined by a dimension extending along the longitudinal axis of the elongated body to which a bonding layer, coating layer, and abrasive grains can be attached to produce the final-formed abrasive article. The elongated body can be made of various materials, including for example, inorganic materials, organic materials (e.g., polymers and naturally occurring organic materials), and a combination thereof. Suitable inorganic materials can include ceramics, glasses, metals, metal alloys, cermets, and a combination thereof. In certain instances, the elongated body is made of a metal or metal alloy material. For example, the elongated body can be made of a transition metal or transition metal alloy material and may incorporate elements of iron, nickel, cobalt, copper, chromium, molybdenum, vanadium, tantalum, tungsten, and the like. In some instances, the elongated body may be a braided structure incorporating a plurality of elongated strands woven together and secured to each other to form an elongated body. Certain designs may utilize piano wire as a suitable structure for the wire.

Suitable organic materials can include polymers, which can include thermoplastics, thermosets, elastomers, and a combination thereof. Particularly useful polymers can include polyimides, polyamides, resins, polyurethanes, polyesters, and the like. It will further be appreciated that the elongated body can include natural organic materials, for example, rubber.

The elongated body can have a certain shape. For example, the elongated body can have a generally cylindrical shape such that it has a circular cross-sectional contour. In using elongated bodies having a circular cross-sectional shape, as viewed in a plane extending transversely to the longitudinal axis of the elongated body. For such embodiments, the average diameter can be at least about 80 microns. Some designs may incorporate thicker elongated body members such that the average diameter can be at least about 150 microns, at least about 200 microns, and particularly within a range between about 80 microns and 400 microns.

In other designs, the elongated body can have a polygonal cross-sectional contour as viewed in a plane extending transversely to the longitudinal axis of the elongated body. The polygonal cross-sectional contour can include various multi-sided shapes, including in particular, rectangular shapes, pentagonal, hexagonal, and the like. In one particular instance, the elongated body can have a rectangular shape, wherein the elongated body is a belt having a first major surface, a second major surface opposite the first major surface and a side surface extending between the first and second major surfaces.

The side surface of the belt can define a thickness of the elongated body, while the first major surface can define a width of the elongated body as measured in a direction transverse to the longitudinal axis. In particular instances, the elongated body can have a thickness:width ratio of at least about 1:2. In other embodiments, the elongated body can have a thickness:width ratio of at least about 1:3, such as at least about 1:4, at least about 1:5, at least about 1:10, at least about 1:50. Still, particular embodiments can have a thickness:width ratio within a range between about 1:2 and 1:150, such as between about 1:2 and about 1:100.

The elongated body can have a length sufficient for conducting wiresawing applications. That is, the elongated body can have a length as measured along the longitudinal axis of the elongated body of at least about 1 km. In other instances, this length can be greater, such as on the order of at least about 5 km, at least about 10 km, and particularly within a range between about 1 km and about 15 km.

A bonding layer can be formed on the elongated body such that it overlies an upper surface of the elongated body to facilitate bonding and securing of abrasive grains therein. In some instances, the bonding layer is directly contacting the upper surface of the elongated body, and in fact, can be directly bonded to the upper surface of the elongated body. Still, in certain abrasive articles, an intervening layer of material may be disposed between the bonding layer and upper surface of the elongated body. Such intervening layers can be present to aid bonding between the elongated body and the bonding layer. Moreover, the bonding layer can be formed such that it covers essentially the entire upper surface of the elongated body. Suitable methods for forming the bonding layer can include deposition processes. For instance, the bonding layer can be deposited on the external surface of the elongated body by a plating process, such as an electroplating process, particularly in designs where the bonding layer comprises a metal material. Alternatively, the bonding layer can be formed through a brazing processes or a gas phase deposition processes.

In various embodiments, a method of forming abrasive articles described herein can include translating a wire through a system that can utilize a plating machine for depositing the bonding layer material on the wire. The wire can be translated through the plating machine, wherein the bonding layer material can be deposited on the upper surface of the elongated body.

The bonding layer can be made of a metal or metal alloy. In certain designs, the bonding layer can include transition metal elements. Some suitable metals can include copper, tin, nickel, tungsten, molybdenum, silver, and a combination thereof. In particular embodiments, the bonding layer can include a metal alloy material that is more ductile than the underlying layer(s) of the elongated body, thus facilitating abrasive grain reception and/or retention in the bonding layer.

After forming a bonding layer on the elongated body, the process of forming the abrasive article can further include embedding abrasive grains within the bonding layer. The process of embedding abrasive grains within the bonding layer can be completed such that the abrasive grains are secured to the wire to form a suitable abrasive article. Notably, the process of embedding the abrasive grains into the bonding layer can be a separate step, particularly separated from other processes for forming the constituent layers (e.g., bonding layer and coating layer).

In accordance with various embodiments, the process of embedding abrasive grains within the bonding layer can include a pressing process wherein the abrasive grains are embedded, at least partially, into the bonding layer material while passing between two or more pressing surfaces. For example, abrasive grains can be passed between a roller and another rigid form, such as a stationary block, another roller, or the like and pressed into the bonding layer while the wire passes therethrough. In one process, a manner for continuously covering the surface of the pressing surfaces in abrasive grains can be undertaken. In other processes, the abrasive grains may be injected into the region between the pressing surfaces proximate to the wire of the abrasive article, such that abrasive grains can be captured between the pressing surfaces and embedded within the bonding layer.

As illustrated, the abrasive grains can be provided on the surface of at least one of the pressing surfaces from a bath, that contains a mixture of the abrasive grains within a liquid carrier. In particular, the liquid carrier can have a chemistry to aid formation of a proper suspension of the abrasive grains, such that a substantially uniform coating and particular concentration of abrasive grains are on the pressing surface, which can aid the formation of an abrasive article having a controlled distribution and concentration of abrasive grains. It will be appreciated, that certain orientations between the pressing surfaces and the bath can be utilized for proper delivery of the liquid carrier and abrasive grains to the region between the pressing surfaces and attachment to the wire.

The liquid carrier can contain a major component that can be an organic material such as water or alcohol. In addition, other components may be added in minor amounts, such as stabilizers, which can also be organic components, for facilitating the formation of a proper suspension within the bath and on the pressing surfaces. Certain processes may utilize a liquid carrier including sodium dodecylsulfate, polyethylene glycol (PEG), and/or isopropanol.

The materials of the abrasive grains can be hard, and thus suitable for use in an abrasive processing. For example, the abrasive grains can have a Mohs hardness of at least about 7, such as at least 8, and more typically on the order of at least about 9. Some suitable materials can include carbides, carbon-based materials (e.g. fullerenes), nitrides, oxides, borides, and a combination thereof may be employed as the abrasive grains. In certain instances, the abrasive grains can be superabrasive grains. For example, diamond (natural or synthetic), cubic boron nitride, and a combination thereof. In one particular embodiment, the abrasive grains consist essentially of diamond.

Notably, the size distribution of the average grit size of the abrasive grains can be modified such that the abrasive grains are selected from a non-Gaussian grit size distribution. For example, the abrasive grains can be selected from a particularly wide grit size distribution that extends over a broad, yet precise range of grit sizes. The range of grit sizes may be selected from between about 1 micron to about 100 microns, such as between 10 microns and about 100 microns, between 15 microns and 100 microns or even between 20 microns and 100 microns. Moreover, the range of grit sizes may be narrower, such as between about 20 microns and about 95 microns or even between about 20 microns and about 90 microns.

The wide grit size distribution may be further characterized by the fact that the distribution comprises a substantially uniform presence of all of the grit sizes across the range of average grit sizes. For example, the percent variation between any two grit sizes within the distribution (i.e., the percentage of abrasive grains having one average grit size as compared to the percentage of abrasive grains having a different average grit size) can be not greater than about 25%. In other instances, the variation may be less, such as not greater than about 20%, not greater than about 15%, not greater than about 12%, not greater than about 10% or even not greater than about 8%. Certain designs may employ a percent variation in the presence of the average grit size between any two average grit sizes within the distribution of between about 2% and about 25%, such as between about 5% and about 20% or between about 5% and about 15%.

For some abrasive articles, the selected wide grit size distribution can be described by a particular percentage of the abrasive grains within the distribution that are present over a range of average grit sizes. The range of grit sizes can be defined by a range of average grit sizes extending from a discrete lower average grit size value to a discrete upper average grit size value. Articles herein can utilize a wide grit size distribution wherein at least 80% of the total number of abrasive grains have an average grit size contained within a grit size range spanning at least about 25 microns of average grit sizes. For example, at least 80% of the total number of abrasive grains can have an average grit size within a range defined by a lower average grit size of 50 microns to an upper average grit size of 75 microns. In other instances, the range of grit sizes may be broader, such that at least 80% of the total number of abrasive grains have an average grit size within a grit size range of at least about 30 microns, at least about 40 microns, at least about 50 microns or even at least about 60 microns.

Some embodiments can employ a greater percentage of the abrasive grains within the broad range of average grit sizes, for example, at least 85%, at least about 90%, or even at least about 95% of the total number of abrasive grains have an average grit size spanning a grit size range of at least about 30 microns, at least about 40 microns, or even at least about 50 microns. Still, embodiments herein may have a wide grit size distribution, wherein at least 95% of the total number of abrasive grains have an average grit size contained within a range of average grit sizes between about 30 microns and about 80 microns, such as between about 30 microns and about 70 microns, and even between about 30 microns and about 60 microns.

Other types of non-Gaussian distributions for the selection of abrasive grains may include distributions using at least two different average grit sizes. One such distribution can be a bimodal grit size distribution. In particular instances, it may be suitable to select at least one grit size that is significantly larger than another grit size to improve performance characteristics. As will be appreciated, a greater number of modes, such as three, four, or more may be employed when forming the selected non-Gaussian grit size distribution. Still, the formation of a wide grit size distribution may not necessarily include the selection and combining of two (or more) separate grit sizes, but the creation of a particular broad, grit size distribution having a uniformity of representative grit sizes across the full range of the distribution.

Notably, the abrasive articles according to embodiments herein, can utilize a particularly wide grit size distribution of grains attached to the elongated body. As described herein, the wide grit size distribution of the abrasive grains may not necessarily be formed by the selection of grains alone, and in particular, can be caused by the forming process. That is, particulars of the pressing process can be sufficient to cause fracture and/or breakage of a certain percentage of the abrasive grains and therein resulting in a wider grit size distribution than afforded by simple sorting processes alone.

A particular concentration of abrasive grains on the final-formed abrasive article may also be used for improved performance characteristics. For example, the process of forming may be such that the abrasive body has an average abrasive grain concentration within the bonding layer of at least about 0.02 ct/m. In other instances, the average abrasive grain concentration can be greater, such as at least about 0.05 ct/m, at least about 0.08 ct/m, at least about 0.10 ct/m, or even at least about 0.20 ct/m. In particular embodiments, the average abrasive grain concentration within the abrasive article can be within a range between about 0.02 ct/m and about 0.30 ct/m, such as between about 0.02 ct/m and about 0.28 ct/m, between about 0.10 ct/m and about 0.28 ct/m, between about 0.10 ct/m and about 0.25 ct/m or even between about 0.15 ct/m and about 0.25 ct/m.

For certain articles, the final-formed abrasive article can exhibit a greater concentration of abrasive grains, such as at least about 20 ct/m. That is, for certain abrasive article designs, the concentration of abrasive grains can be at least about 22 ct/m at least about 24 ct/m, or even at least about 25 ct/m. In certain exemplary articles, the concentration of abrasive grains can be within a range between about 20 ct/m and about 30 ct/m, such as between about 22 ct/m and about 30 ct/m, and more particularly, between about 24 ct/m and about 28 ct/m.

After embedding the abrasive grains within the bonding layer, a coating layer can be formed overlying the bonding layer and a portion of the abrasive grains. The coating layer can be formed such that it is directly bonded to the upper surface of the bonding layer and portions of the exposed surfaces of the abrasive grains extending above the bonding layer. Typically, the abrasive article is formed such that the coating layer forms a continuous coating over the external surface area of the bonding layer and portions of abrasive grains. The coating layer can, in some instances, completely coat some or all of the abrasive grains. In other abrasive articles, the coating layer may only partially cover the abrasive grains, such that a portion of the abrasive grains are exposed and protrude above the external surface of the coating layer.

The coating layer can be applied via a deposition process. One particularly suitable deposition process includes an electroplating process, wherein the wire is translated through an electroplating machine. As such, the coating layer can be made of a metal material or metal alloy. Certain suitable metals can include transition metal elements. For example, according to one embodiment, the coating layer comprises nickel, such that the coating layer can be made essentially of nickel. The use of nickel-based coating layers can also utilize nickel-based alloy materials. As such, other metal elements, such as transition metal elements, may be employed within the nickel-based alloy composition as alloying species.

FIG. 1 includes a cross-sectional illustration of an abrasive article in accordance with an embodiment. As illustrated, the abrasive article 300 includes an elongated body 301 as a core article having a circular cross-sectional shape. Surrounding the elongated body 301 is a bonding layer 303 such that it substantially covers the upper surface 306 of the elongated body 301.

In accordance with a particular embodiment, the bonding layer 303 can be formed to have an average thickness of at least about 10 microns. In other cases, the bonding layer 303 can be more robust, having an average thickness on the order of at least about 15 microns, at least about 20 microns, or even at least about 25 microns. For example, the bonding layer 303 can have an average thickness within a range between about 10 microns and about 50 microns, such as within a range between about 15 microns and about 50 microns, or even more particularly within a range between about 20 microns and about 50 microns.

Optionally, the bonding layer 303 can incorporate a filler 309 within the bonding layer 303. The filler 309 can include an abrasive particulate to improve the abrasive capabilities and wear characteristics of the bonding layer 303. However, the abrasive particulate of the filler 309 can be significantly different than the abrasive grains 307, particularly with regard to size, such that in certain instances the filler 309 can have an average grain size that is substantially less than the average grain size of the abrasive grains 307. That is, the abrasive particulate of the filler 309 can have an average grain size that is at least about 2 times less than the average grit size of the smallest abrasive grains 307. In fact, the abrasive particulate may have an average grain size that is even smaller, such as on the order of at least 3 times less, such as at least about 5 times less, at least about 10 times less, and particularly within a range between about 2 times and about 10 times less than the average grit size of the smallest abrasive grains 307.

The abrasive particulate making up the filler 309 within the bonding layer 303 can be made from a material such as carbides, carbon-based materials (e.g. fullerenes), borides, nitrides, oxides, and a combination thereof. In particular instances, the abrasive particulate can be a superabrasive material such as diamond, cubic boron nitride, or a combination thereof. It will be appreciated that the abrasive particulate of the filler 309 can be the same material as that of the abrasive grains 307. In other instances, the abrasive particulate of the filler 309 can include a different material than the material of the abrasive grains 307.

Certain abrasive articles herein may utilize a coating layer 305 overlying the bonding layer 303 and portions of the abrasive grains 307 and having an average thickness of not greater than about 15 microns. In other instances, the coating layer may be thinner, such that the average thickness is not greater than about 10 microns, such as not greater than about 8 microns, not greater than about 5 microns, and particularly within a range between about 2 microns and 15 microns, or between about 1 micron and about 10 microns, or even between about 5 microns and about 10 microns.

As further illustrated in FIG. 1, the coating layer 305 can include an optional coating filler material 311 contained within the coating layer 305. The coating filler material 311 may be placed within the coating layer 305 such that substantially all of the coating filler material 311 is surrounded by the material of the coating layer 305. Notably, the coating layer filler 311 can include an abrasive particulate having the same features of the abrasive particulate of the filler material 309 within the bonding layer 303. In particular embodiments, the abrasive particulate making up the coating filler material 311 can be the same as the abrasive particulate of the filler material 309 within the bonding layer 303. Still, in other embodiments, the abrasive particulate of the coating filler material 311 can be different than the abrasive particulate of the filler material 309 of the bonding layer 303.

The abrasive articles herein demonstrate particular performance characteristics. Notably, the abrasive articles herein may be suitable for use in slicing though hard, crystalline materials, such as single crystal sapphire and the like, especially for single crystal or polycrystalline materials that may be used in photovoltaic devices. For example, the abrasive articles herein are capable of cutting through a total of at least about 200 $cm^2$ of sapphire at an average cutting rate of at least 0.8 mm/min. In fact, certain articles have demonstrated a capability of cutting through a greater amount of sapphire at the minimum cutting grate of at least 0.8 mm/min, such as at least about 300 cm², or even at least about 400 cm². Particular abrasive articles according to embodiments herein are capable of slicing through between about 200 cm² and about 500 cm², such as on the order of between about 250 cm² and about 475, or more particularly between about 300 cm² and about 450 cm² of sapphire at a minimum rate of 0.8 mm/min over a useable lifetime of the article.

In particular instances, the abrasive articles according to embodiments herein are capable of achieving faster cutting rates through significant amounts (measured in cross-section) of single crystal sapphire. For example, in one embodiment, the abrasive article can cut through a total of at least about 400 cm² of sapphire at an average cutting rate of at least 0.9 mm/min, such as on the order of at least about 1 mm/min, at least about 1.2 mm/min, at least about 1.3 mm/min, or even at least about 1.4 mm/min. Particular embodiments can have a cutting rate through a total of at least 400 cm² of sapphire of between about 0.8 mm/min and about 1.5 mm/min, such as between about 0.9 mm/min and about 1.5 mm/min, and even between about 1 mm/min and about 1.4 mm/min.

Moreover, the abrasive articles herein demonstrate improved cutting lifetimes, especially through hard materials (e.g., sapphire). For example, certain abrasive articles according to the embodiments demonstrate a cutting lifetime (i.e., use of wire for actual cutting) of at least about 5 hours through sapphire. Some other abrasive articles have shown a cutting life of at least about 8 hours, such as at least about 10 hours, at least about 15 hours, at least about 18 hours, or even at least about 20 hours. Particular embodiments can have a cutting life within a range between about 5 hours and 25 hours, such as between about 10 hours and 25 hours, or even between about 15 hours and 25 hours.

Figure 2A:
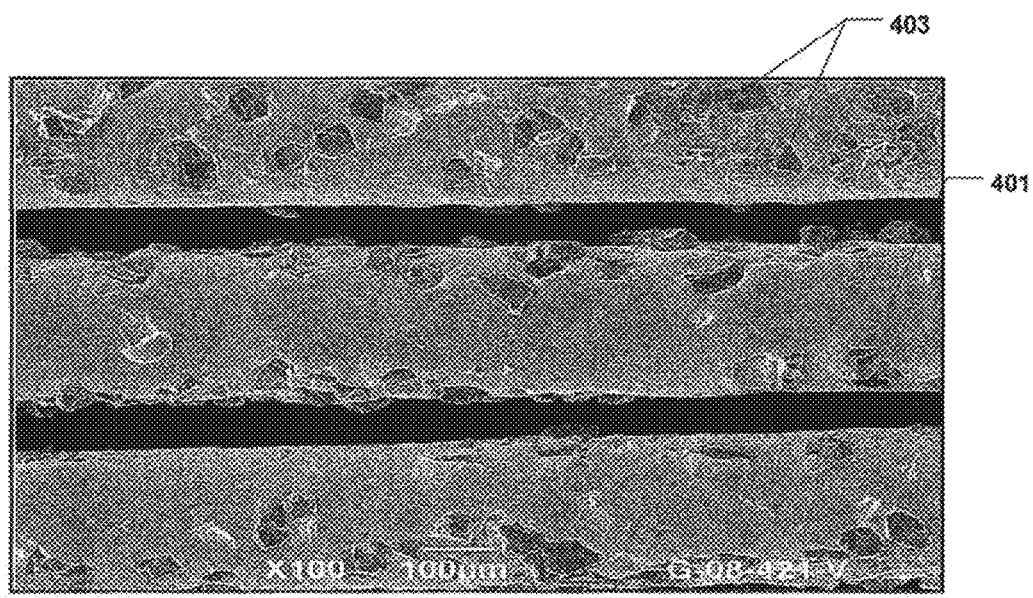
FIG. 2A-2B include magnified images of abrasive articles according to embodiments herein.
Figure 2B:
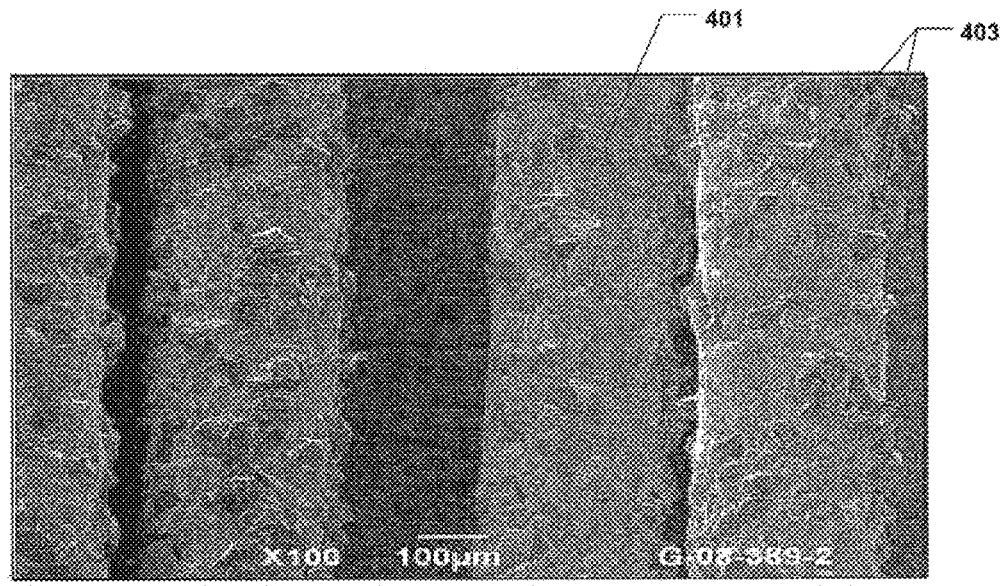

FIGS. 4A-4B include magnified images of abrasive articles according to embodiments herein. Each of FIGS. 4A-4B illustrate portions of abrasive articles having abrasive grains 403 attached to the surface of a wire via a coating layer 401. The image of FIG. 2A is an abrasive article produced according to the processes herein having an average abrasive grain concentration of 0.06 ct/m. The abrasive article of FIG. 2B was also formed according to the processes described herein, and has an average abrasive grain concentration of 0.11 ct/m. As can be seen in a comparison, the average abrasive grain concentration of the abrasive article of FIG. 2B is greater than the average abrasive grain concentration of the abrasive article of FIG. 2A.

EXAMPLE

The following example provides a comparison between the abrasive article formed according to embodiments herein and a conventional wire saw formed using a similar process. A first sample (Sample 1) was formed according to embodiments herein. The wire material used was standard spring steel piano wire. The wire was coated over the entire external surface area with a copper bonding layer material having an average thickness of approximately 40 microns. Abrasive grains were then embedded into the wire.

Figure 3:
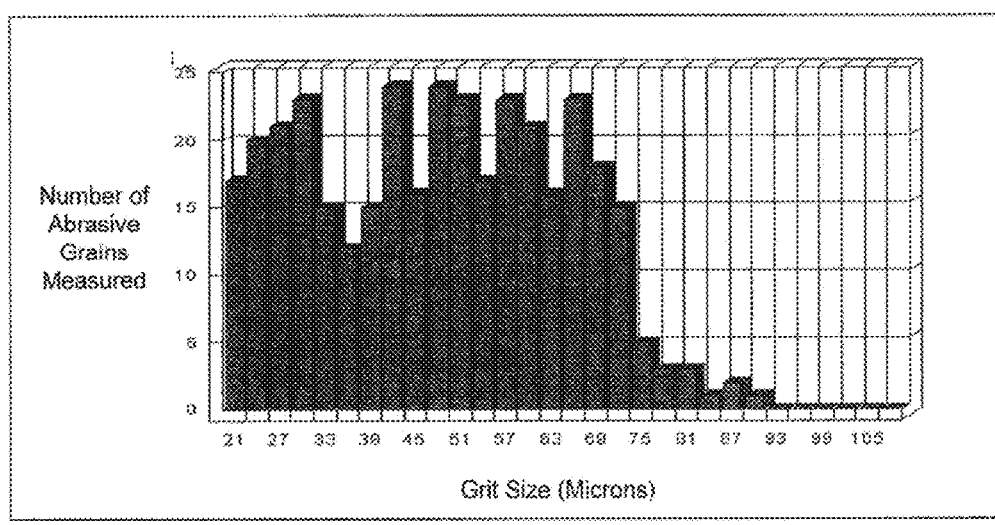
FIG. 3 includes a plot of a grit size distribution for abrasive grains for use in an abrasive article in accordance with an embodiment.
Figure 4:
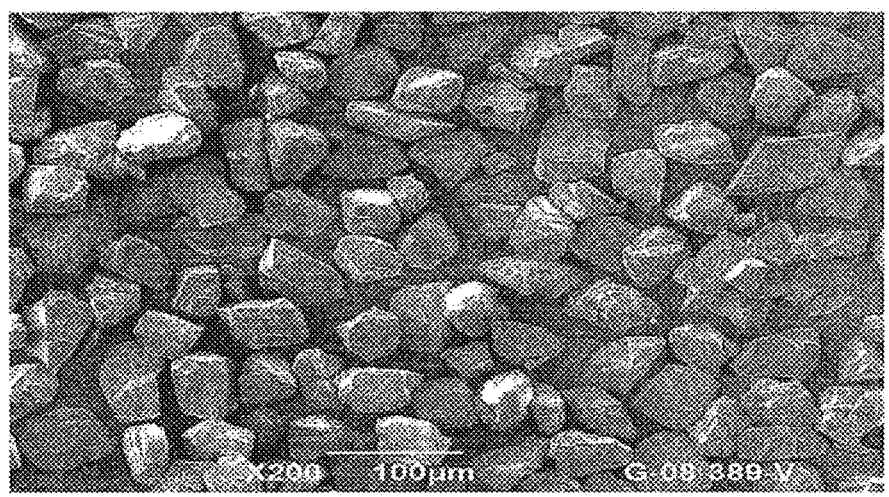
FIG. 4 includes an image of a representative sample of abrasive grains having a particular distribution of grit sizes in accordance with an embodiment.

The distribution of abrasive grains selected for embedding into the bonding layer is illustrated in FIG. 3, and an image of a representative sample of the grit sizes of the selected abrasive grains is provided in FIG. 4. Notably, the abrasive grains were selected from a wide grit size distribution, wherein all of the abrasive grains were within the range of average grit sizes between 20 microns to 93 microns, approximately 90% of the abrasive grains spanned a 50 micron range of grit sizes between 20 microns and about 70 microns, and the percent variation within the range of grit sizes was not greater than 10% between the least populated average grit size (e.g., approximately 90 microns) and the most populated average grit size (e.g., approximately 42 microns) within the distribution.

The abrasive grain coated wire of Sample 1 was then coated with a coating layer of material via an electroplating process. The coating layer was a nickel-based alloy having a composition comprising approximately 98% nickel and approximately 2% of other metals species, and other materials. The final-formed abrasive wire had an average abrasive grain concentration of 0.11 ct/m, a portion of which is illustrated in FIG. 2B.

A second sample (Sample 2) was formed according to the process noted above for Sample 1. The final-formed abrasive article of Sample 2 was formed to have an average abrasive grain concentration of 0.06 ct/m, a portion of which is illustrated in FIG. 2A.

Figure 5:
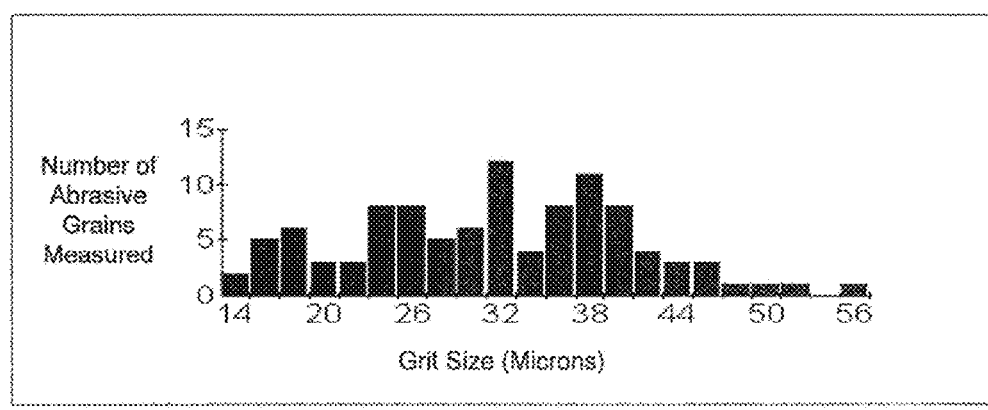
FIG. 5 includes a plot of a grit size distribution for abrasive grains for use in a conventional wire saw article.
Figure 6:
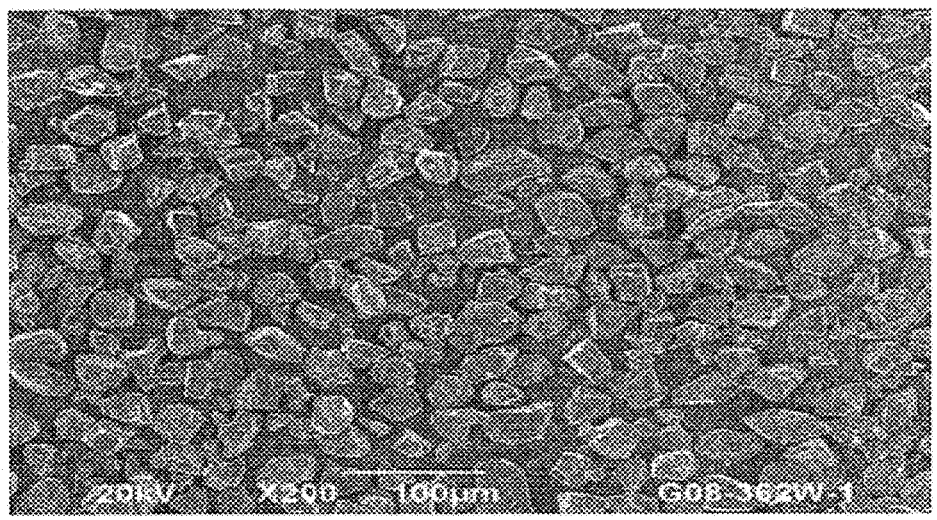
FIG. 6 includes an image of a representative sample of abrasive grains having a particular distribution of grit sizes for a conventional wire saw article.
Figure 7:
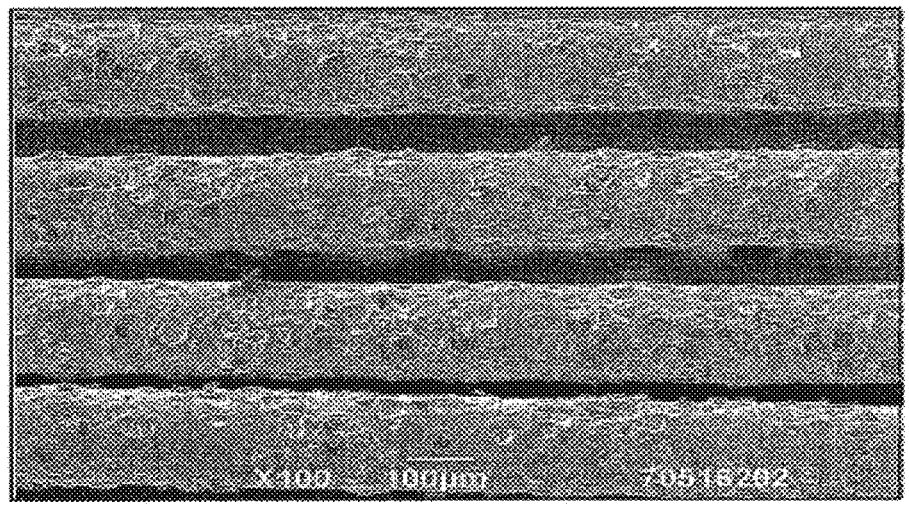
FIG. 7 includes a magnified image of abrasive articles according to embodiments herein.

A conventional wire sawing article (Sample C1) thought to be formed by rolling the abrasive grains into the wire material was obtained for comparative purposes. The abrasive grains were analyzed and the distribution of grit sizes of the abrasive grains is provided in FIG. 5, and an image of a representative sample of the grit sizes of the selected abrasive grains is provided in FIG. 6. As can be seen from the chart of FIG. 5 and the image of FIG. 6, the grain size distribution is narrow, the vast majority of grit sizes spanning a range of grit sizes of about 30 microns with a standard mean of about 32 microns. The coating layer was made of a nickel-based alloy material and the abrasive grain concentration was calculated to be 0.01 ct/m. A magnified image of a portion of the conventional wire saw material is provided in FIG. 7.

Samples 1 and 2 and the conventional sample, Sample C1, were then tested to compare certain performance characteristics. Each of the samples were used to slice through 2 inch (5.08 cm) diameter single crystal sapphire blanks. Each successful slice through a sapphire blank was recorded as a "Cut" and the duration to slice through the blank was recorded for each of the samples. Each of the wires were run at a rate of 8 m/s, under a load of 16 N. Each of the samples were run until the wire failed, wherein failure occurred through breaking of the wire or a failure to cut through the sapphire blank.

Figure 8:
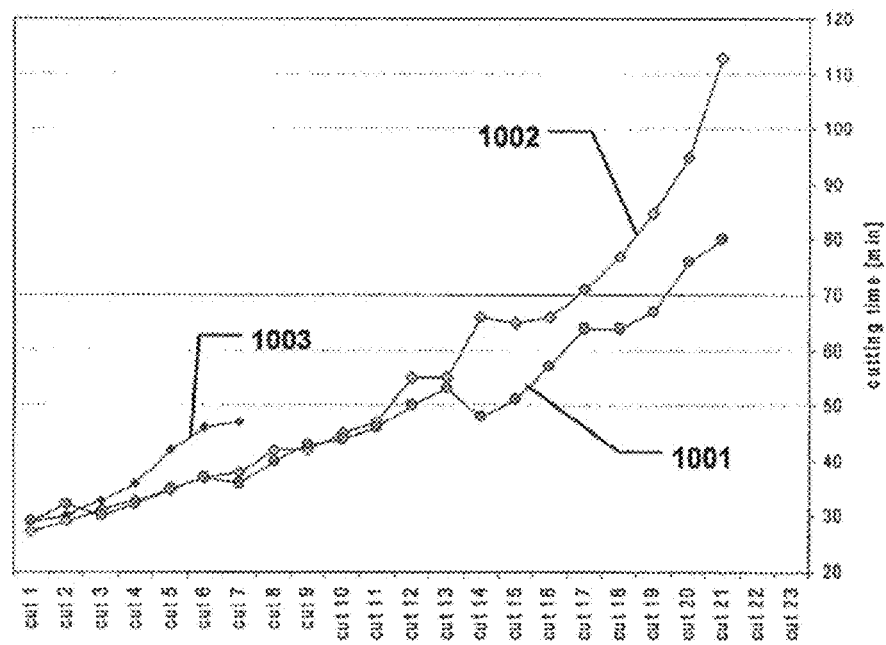
FIG. 8 provides plots of the performance based on number of cuts versus cutting time for the samples formed according to embodiments herein as compared to a conventional sample.

FIG. 8 provides plots of the performance for each of the samples, wherein plot 1001 corresponds to Sample 1, plot 1002 corresponds to Sample 2, and plot 1003 corresponds to Sample C1. As illustrated, Samples 1 and 2 demonstrate an improved ability to slice through a significantly greater total amount of sapphire material than Sample C1. In fact, Samples 1 and 2 demonstrate a capability of cutting through over twice as much total sapphire material than Sample C1. Moreover, Samples 1 and 2 demonstrated more rapid cutting of the sapphire material for Cuts 1-7 than the Sample C1. Overall, Sample 1 was capable of slicing through 426 cm² of sapphire material at an average rate of 1.13 mm/min. Sample 2 achieved an average rate of 0.85 mm/min for the same total amount of sapphire material (426 cm²).

The foregoing includes a description of abrasive articles that represent a departure from the state-of-the-art. The abrasive articles herein are directed to wire saw abrasive tools incorporating elongated body members having abrasive grains that are secured to the elongated body via a bonding layer of metal and a coating layer. In particular, the abrasive articles herein may be suitable for use in wire sawing applications, particularly for the electronics industry, including slicing or sectioning of single crystal or polycrystalline materials that may be used in photovoltaic devices. With regard to this industry, it should be noted that a particular focus is the reduction of material loss of these expensive advanced materials, reduction of cutting times and thus costs, as well as a reduction of subsurface damage of such expensive materials. The embodiments herein incorporate a combination of features that includes select distributions of abrasive grain grit sizes, certain bonding layer and coating layer materials and thicknesses, average abrasive grain concentrations, and other features described herein.

In the foregoing, reference to specific embodiments and the connections of certain components is illustrative. As such, the above-disclosed subject matter is to be considered not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The Abstract of the Disclosure is provided to comply with Patent Law and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description of the Drawings, with each claim standing on its own as defining separately claimed subject matter.

What is claimed is:

1. An abrasive article comprising:
   an elongated body;
   a bonding layer overlying a surface of the elongated body;
   abrasive grains contained within the bonding layer at an average abrasive grain concentration within a range between about 0.02 ct/m and about 0.30 ct/m along a length of the elongated body, wherein the abrasive grains define a non-Gaussian distribution, wherein at least 80% of a total number of abrasive grains are contained within a grit size range spanning at least about 25 microns, wherein at least 95% of the total number of abrasive grains are contained within a grit size range spanning average grit sizes between about 30 microns and about 80 microns; and
   a coating layer, wherein the coating layer forms a continuous coating overlying the bonding layer and portions of the abrasive grains.

2. The abrasive article of claim 1, wherein the elongated body is a wire.

3. The abrasive article of claim 1, wherein the elongated body comprises a length of at least about 1 km.

4. The abrasive article of claim 1, wherein the non-Gaussian distribution comprises a bimodal grit size distribution including a first mode and a second mode.

5. The abrasive article of claim 1, wherein the non-Gaussian distribution is defined by at least three different modes.

6. The abrasive article of claim 1, wherein the abrasive grains define a wide grit size distribution characterized by a grit size range spanning at least about 50 microns.

7. The abrasive article of claim 1, wherein the coating layer comprises a metal.

8. The abrasive article of claim 7, wherein the coating layer comprises nickel.

9. The abrasive article of claim 1, wherein the bonding layer comprises an average thickness within a range between about 10 microns and about 50 microns.

10. The abrasive article of claim 9, wherein the bonding layer comprises a filler.

11. The abrasive article of claim 10, wherein the filler comprises an abrasive particulate.

12. The abrasive article of claim 11, wherein the abrasive particulate of the filler can have an average grain size that is at least about 2 times less than the average grit size of the abrasive grains.

13. The abrasive article of claim 1, wherein the abrasive article is capable of cutting through a total of at least about 200 cm2 of sapphire at an average cutting rate of at least 0.8 mm/min.

14. The abrasive article of claim 13, wherein the abrasive article has at least 5 hours of cutting life.

* * * * *